United States Patent
Darby et al.

(10) Patent No.: US 9,382,011 B2
(45) Date of Patent: Jul. 5, 2016

(54) MULTIPLE AIRCRAFT ENGINE CONTROL SYSTEM AND METHOD OF COMMUNICATING DATA THEREIN

(71) Applicant: PRATT & WHITNEY CANADA CORP., Longueuil (CA)

(72) Inventors: Michael Darby, Candiac (CA); Brant Duke, Lasalle (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 5 days.

(21) Appl. No.: 14/250,035

(22) Filed: Apr. 10, 2014

(65) Prior Publication Data

US 2015/0291286 A1    Oct. 15, 2015

(51) Int. Cl.
| | | |
|---|---|---|
| G06F 7/00 | (2006.01) |
| G06F 17/00 | (2006.01) |
| B64D 31/06 | (2006.01) |
| F02C 9/00 | (2006.01) |
| H04L 12/40 | (2006.01) |
| F02D 25/00 | (2006.01) |
| F02C 9/42 | (2006.01) |

(52) U.S. Cl.
CPC . *B64D 31/06* (2013.01); *F02C 9/00* (2013.01); *F02C 9/42* (2013.01); *F02D 25/00* (2013.01); *H04L 12/40189* (2013.01); *F05D 2240/40* (2013.01)

(58) Field of Classification Search
CPC .............. F02C 7/277; F02C 9/16; F02C 7/18; F02C 9/30; F02C 7/14; F02D 2041/007; F02D 13/0261; F02D 35/025; F02D 35/023; F02D 41/1497; F02D 29/02; F02D 2250/18; F02D 2250/02; F02D 25/00; F02D 28/00; F02D 41/021; B64D 35/08; B64D 31/06; B64D 31/14; B64D 41/00; B64D 45/00; B64D 2045/0085; B64D 2041/002; B64D 43/00
USPC ......... 701/100, 3, 99, 102, 22, 29.1, 32.3, 48, 701/1, 101, 117, 23, 36, 409, 519, 532
See application file for complete search history.

(56) References Cited

U.S. PATENT DOCUMENTS

| | | | | |
|---|---|---|---|---|
| 5,136,841 | A * | 8/1992 | Zimmerman | G05D 1/0077 60/233 |
| 6,141,951 | A * | 11/2000 | Krukoski | F04D 27/001 60/772 |
| 6,195,247 | B1 * | 2/2001 | Cote | F02C 7/26 361/247 |
| 6,480,780 | B1 * | 11/2002 | Schwamm | G05B 9/03 123/319 |
| 7,020,076 | B1 * | 3/2006 | Alkalai | H04L 1/22 370/217 |
| 7,206,877 | B1 | 4/2007 | Doerenberg et al. | |
| 7,688,862 | B2 * | 3/2010 | Wisler | H04J 3/0664 370/395.62 |
| 7,779,811 | B1 * | 8/2010 | Mailander | H05K 7/20445 123/399 |
| 8,036,805 | B2 * | 10/2011 | Mahoney | F02C 9/28 701/100 |

(Continued)

*Primary Examiner* — Calvin Cheung
*Assistant Examiner* — Luis A Martinez Borrero
(74) *Attorney, Agent, or Firm* — Norton Rose Fulbright Canada LLP (57) ABSTRACT

The multiple aircraft engine control system having a corresponding engine controller associated with each one of the engines, each one of the engine controllers having at least two independent channels, each one of the at least two independent channels having at least two communication buses, each one of the at least two communicating buses of each channel being connected to a respective one of the at least two communicating buses of each one of the other channels. The method can time-interweave originating data of the channels.

11 Claims, 11 Drawing Sheets

(56) References Cited

U.S. PATENT DOCUMENTS

| | | | | |
|---|---|---|---|---|
| 8,327,117 B2* | 12/2012 | Smilg | G05B 19/042 | 701/100 |
| 8,504,646 B2* | 8/2013 | Jeung | H02P 31/00 | 340/438 |
| 8,583,294 B2* | 11/2013 | Villano | B64C 13/42 | 60/228 |
| 2003/0056492 A1* | 3/2003 | Henson | F01D 25/26 | 60/39.281 |
| 2003/0099256 A1* | 5/2003 | Feinberg | H04L 29/06 | 370/473 |
| 2003/0200274 A1* | 10/2003 | Henrickson | G06F 8/63 | 709/212 |
| 2004/0119454 A1* | 6/2004 | Chang | H02J 3/34 | 323/284 |
| 2005/0049775 A1* | 3/2005 | Mooney | F02C 9/28 | 701/100 |
| 2005/0197750 A1* | 9/2005 | MacDougall | H04L 12/40169 | 701/3 |
| 2005/0210317 A1* | 9/2005 | Thorpe | G06F 3/0613 | 714/6.32 |
| 2008/0084171 A1* | 4/2008 | Leehey | G05B 19/042 | 318/34 |
| 2008/0307249 A1* | 12/2008 | Aiso | H04H 60/04 | 714/3 |
| 2009/0044041 A1* | 2/2009 | Armbruster | H04L 12/40189 | 714/3 |
| 2009/0055145 A1* | 2/2009 | Volponi | G05B 17/02 | 703/7 |
| 2009/0306839 A1* | 12/2009 | Youngquist | G01K 7/021 | 701/14 |
| 2009/0312892 A1* | 12/2009 | Mahoney | F02C 9/28 | 701/3 |
| 2009/0315497 A1* | 12/2009 | Jeung | H02P 31/00 | 318/558 |
| 2010/0126136 A1* | 5/2010 | Anson | F02C 7/22 | 60/39.281 |
| 2010/0198447 A1* | 8/2010 | Maier | F02D 41/222 | 701/31.4 |
| 2010/0241331 A1* | 9/2010 | Duke | F01D 25/18 | 701/100 |
| 2010/0274416 A1* | 10/2010 | Poisson | B64D 31/14 | 701/3 |
| 2011/0048027 A1* | 3/2011 | Waldhorn | F02C 3/20 | 60/776 |
| 2011/0239992 A1* | 10/2011 | Metzdorf | F02D 41/266 | 123/498 |
| 2012/0230181 A1 | 9/2012 | Dame | | |
| 2012/0318914 A1* | 12/2012 | Rajashekara | B64D 41/00 | 244/58 |
| 2013/0181448 A1* | 7/2013 | Larson | B60L 8/006 | 290/43 |
| 2013/0181687 A1* | 7/2013 | Smout | H02P 9/02 | 322/16 |
| 2013/0191004 A1* | 7/2013 | Beecroft | F01D 11/20 | 701/100 |
| 2013/0223976 A1* | 8/2013 | Smith | G05B 19/0426 | 415/1 |
| 2013/0253735 A1* | 9/2013 | Roy | B64D 31/00 | 701/3 |
| 2014/0114549 A1* | 4/2014 | Ziarno | G05B 23/0213 | 701/100 |
| 2014/0136028 A1* | 5/2014 | Ausman | G01D 7/00 | 701/3 |
| 2014/0316684 A1* | 10/2014 | Radke | F02D 25/00 | 701/115 |
| 2015/0148994 A1* | 5/2015 | Nagashima | B64D 31/06 | 701/3 |
| 2015/0251770 A1* | 9/2015 | Bisson | F02C 9/42 | 244/58 |
| 2015/0333527 A1* | 11/2015 | Rideau | H02J 5/00 | 307/31 |

* cited by examiner

MULTIPLE AIRCRAFT ENGINE CONTROL SYSTEM AND METHOD OF COMMUNICATING DATA THEREIN

TECHNICAL FIELD

The application relates generally to the control of gas turbine engines and, more particularly, to a method of communicating data between multiple channels of a plurality of engine controllers.

BACKGROUND OF THE ART

Full authority digital engine controls (FADECs) are well known systems used to automatically control the performance of an aircraft engine. A separate FADEC is typically associated to each one of the engines of the aircraft. Typically, each FADEC has two (or more) fully functional and independent 'channels' which provide redundancy to each other to maintain engine performance control in the event of an individual channel failure.

Each channel thus typically has some form of engine control unit (ECU) (sometimes referred to as electronic engine controller—EEC) and related accessories which control the aspects of aircraft engine performance. In short, the ECU receives data (e.g. air density, throttle lever position, engine pressures/temperatures), processes the data, determines any adjustments to be made to controlled engine parameters, and controls the engine parameters (e.g. fuel flow, vane position) accordingly.

In many modern FADECs applications on multiple engine aircrafts, buses are provided to allow communication between channels of different engines and each engine can receive data concerning operating conditions of the other engine(s) via the associated bus and this latter data is included in the processing operation to optimize engine control parameters.

Although FADECs and their associated buses provided communication which was satisfactory to a certain degree, there remains room for improvement. In particular, it was desired to improve overall communication throughput and/or reduce time delays of the communications between engine FADECs whilst retaining redundancy and fault tolerance to single point failures.

SUMMARY

In one aspect, there is provided a method of communicating data in a multiple aircraft engine control system having a corresponding engine controller associated with each one of the engines, each one of the engine controllers having at least two independent channels, and at least two buses independently connecting each one of the channels to one another, the engine controllers being configured to repeatedly, over subsequent cycles, transmit data originating from each of the channels to all the other channels over the buses in a sequential manner, with one channel transmitting after the other, during subsequent associated time slots of a corresponding cycle, the method comprising: during a time slot associated to a given one of the channels in a given one of the cycles, transmitting a first portion of the originating data of the given channel over a first one of the buses and transmitting a second portion of the originating data of the given channel over a second one of the buses; and during a time slot associated to the given channel in a subsequent one of the cycles, transmitting the second portion of the originating data of the given channel over the first bus and transmitting a first portion of the originating data of the given channel over the second bus; wherein the method is repeated during time slots associated to other channels within each cycle, and repeated for other cycles.

In a second aspect, there is provided a multiple aircraft engine control system having a corresponding engine controller associated with each one of the engines, each one of the engine controllers having at least two independent channels, each one of the at least two independent channels having at least three communication buses with at least two of the at least three communication buses of each channel being connected to a respective one of the at least two communicating buses of each one of the other channels via aircraft wiring, and at least one of the at least three communication buses being connected directly to a respective communication bus of a same engine.

In a third aspect, there is provided a method of communicating data between multiple engine controllers, each one of the engine controllers having at least two independent channels, and at least two buses independently connecting each one of the channels to one another, the engine controllers being configured to repeatedly, over subsequent cycles, transmit data originating from each of the channels to all the other channels over the buses in a sequential manner, with one channel transmitting after the other, during subsequent associated time slots of a corresponding cycle, the method comprising: during a time slot associated to a given one of the channels in a given one of the cycles, transmitting a first portion of the originating data of the given channel over a first one of the buses and transmitting a second portion of the originating data of the given channel over a second one of the buses; and during a time slot associated to the given channel in a subsequent one of the cycles, transmitting the second portion of the originating data of the given channel over the first bus and transmitting a first portion of the originating data of the given channel over the second bus; wherein the method is repeated during time slots associated to other channels within each cycle, and repeated for other cycles.

Further details of these and other aspects of the present invention will be apparent from the detailed description and figures included below.

DESCRIPTION OF THE DRAWINGS

Reference is now made to the accompanying figures, in which.

DETAILED DESCRIPTION

Figure 1:
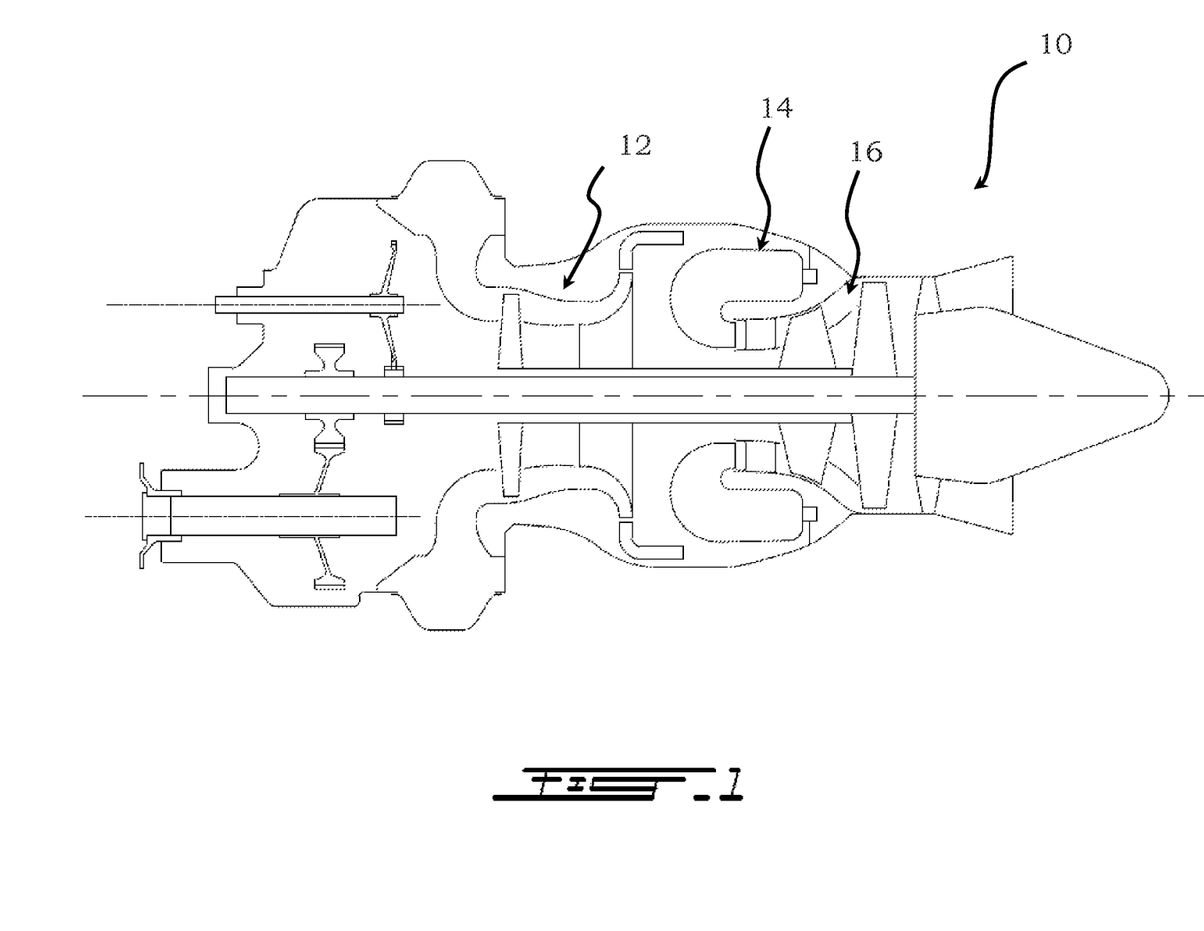
FIG. 1 is a schematic cross-sectional view of a gas turbine engine.

FIG. 1 illustrates an example of a turbine engine. In this example, the turbine engine 10 is a turboshaft engine generally comprising in serial flow communication, a multistage compressor 12 for pressurizing the air, a combustor 14 in which the compressed air is mixed with fuel and ignited for generating an annular stream of hot combustion gases, and a turbine section 16 for extracting energy from the combustion gases. The turbine engine terminates in an exhaust section.

Figure 2:
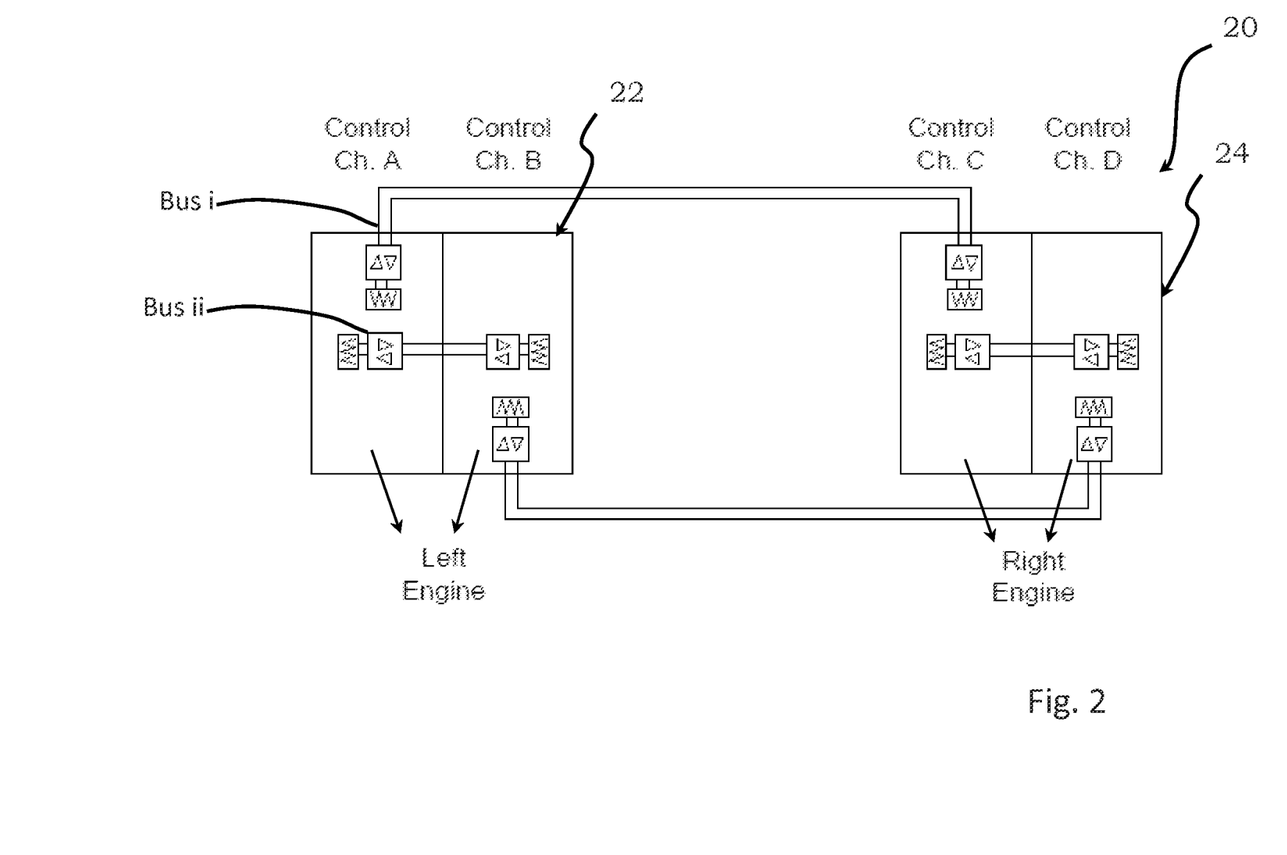
FIG. 2 is a schematic view of a first example of a multiple aircraft engine control system.

An example of a multiple aircraft engine control system 20 for an aircraft with two engines is shown in FIG. 2. This embodiment has two dual channel FADECs 22, 24, one per engine. Each one of the channels (A, B, C, D) can independently control its associated engine, and has two independent buses (i, ii) which communicate with two other ones of the channels in a point to point configuration globally encompassing all channels as shown in the figure. Accordingly, each one of the channels is connected directly to two of the other channels (which can be referred to as 'adjacent channels'), but only indirectly from the third one of the other channels (which can be referred to as an 'opposite' channel). When it is required to have information from the opposite channel, this information is relayed through one of the adjacent channels (i.e. Channel D data is relayed to Channel A via Channel B, Channel B data is relayed to Channel C via Channel A, etc.). Accordingly, at least one of the channels must then not only communicate its own data, but also rebroadcast the data of one of the adjacent channels to the other. This arrangement poses limits to overall communication bandwidth during normal operation. Moreover, in the event of a single bus failure, critical data must be broadcast via the other remaining three bus links, with each rebroadcast adding additional delay. There is also significant software overhead to perform the data transfers associated with scheduling each broadcast of the data to each bus link.

It will be understood that in this embodiment, the communication bus between control channels of a given FADEC (e.g. bus ii of Channel A to Channel B) can be internal to the FADEC, whereas the communication bus between control channels of different engines (e.g. bus i from Channel A to Channel C) may rely on aircraft wires.

Figure 3:
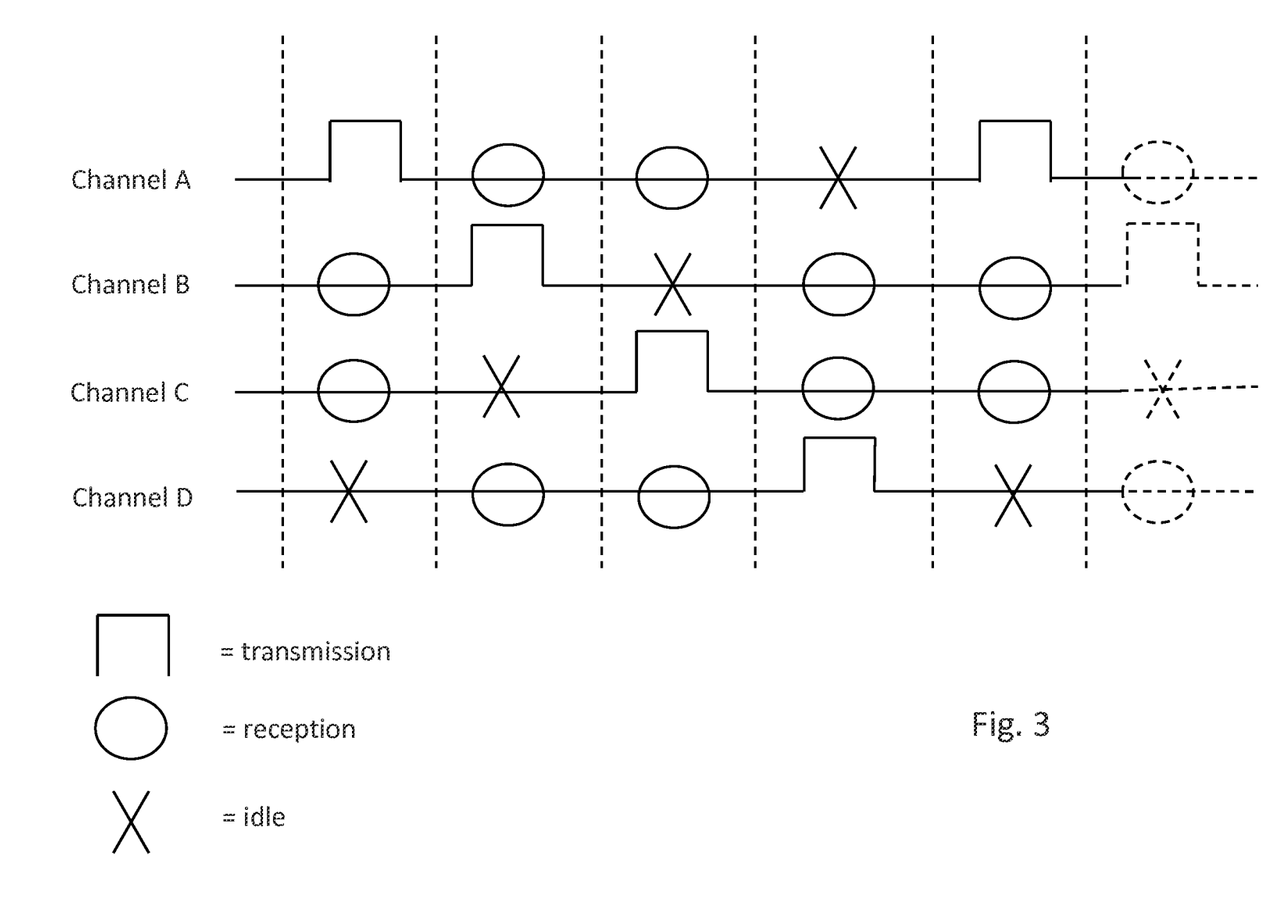
FIG. 3 is a schematic view showing a method of communicating data between channels of the control system of FIG. 2.

The method of operating the channels can limit the data throughput. Normal operation of the channels of FIG. 2 can be split into a repeating sequence of time slot/channel transmission attributions over time, such as shown in FIG. 3. During each specific time slot, an associated one of the channels broadcasts its data packet on its two associated buses and the other channels are in a receiving mode. In the event where one of the channels becomes unsynchronized with the others, software can attribute priorities to individual ones of the channels and re-synchronize accordingly.

Figure 4A:
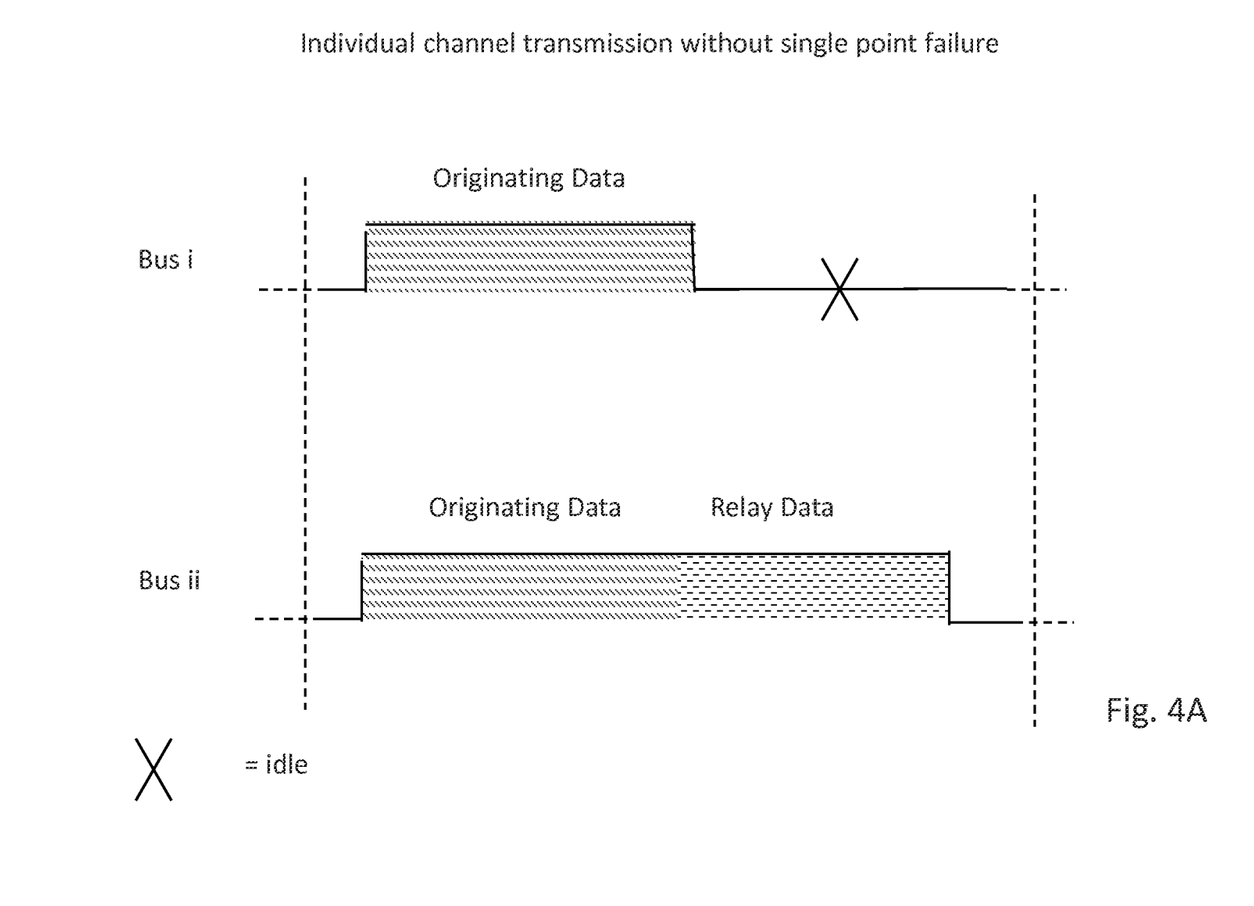
FIG. 4A is a schematic view showing the size of data attribution in a given time slot, in a single channel transmission over two buses, in a scenario without single point failure.
Figure 4B:
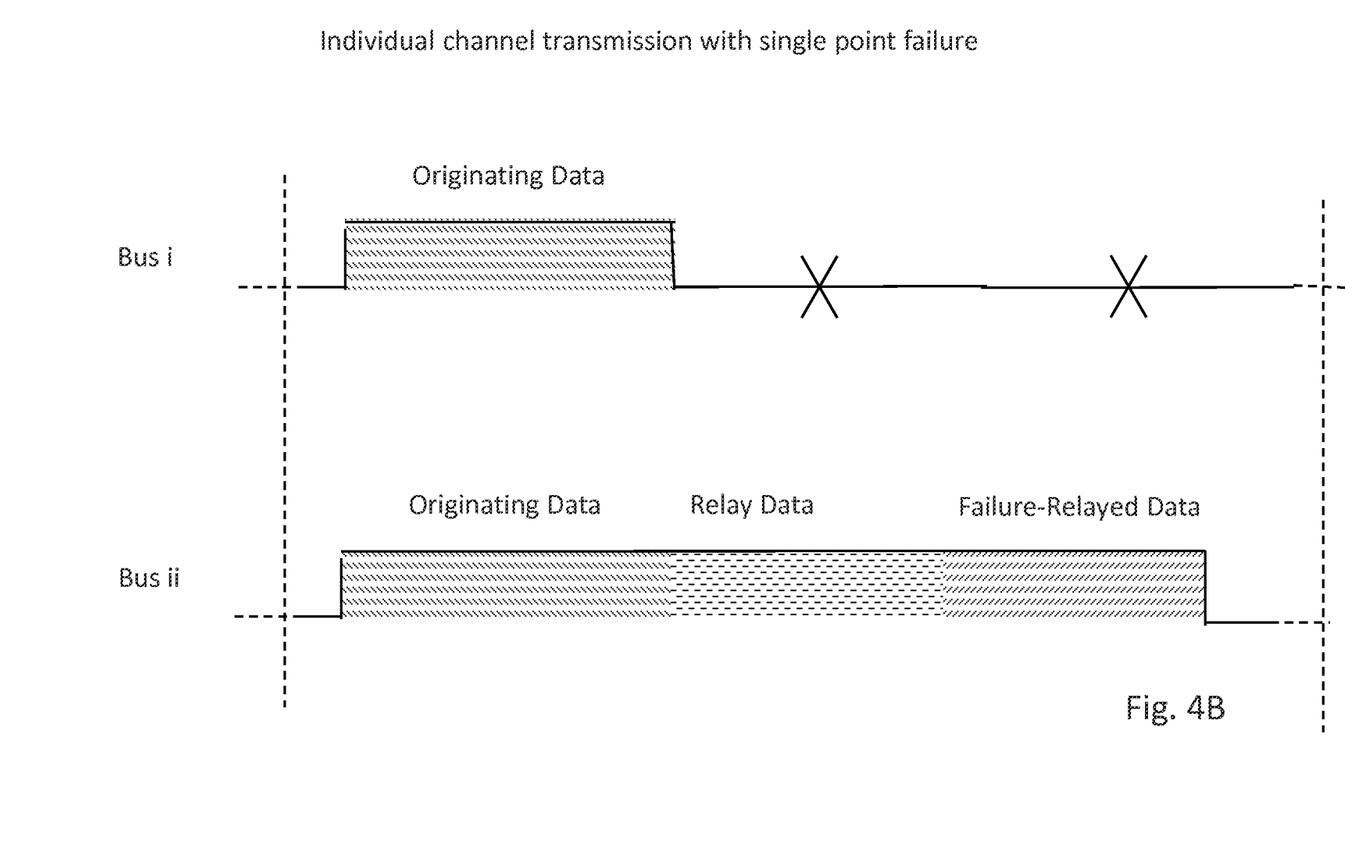
FIG. 4B is a schematic view showing the size of data attribution in a given, software-enlarged time slot, in a single channel transmission over two buses, in a scenario of single point failure.

As it can be understood from FIG. 3, this method of operation does not provide redundancy of the information per se. In other words, during its associated time slot, each channel transmits data simultaneously on both buses (i, ii). Moreover, as shown in FIG. 4A, each channel transmits at least its originating data on both buses (i, ii), and additionally relays data previously received from one adjacent channel to the other adjacent channel on one of the buses (here bus ii). It will be understood in this configuration that the time slots, which have a duration associated to both the quantity of data and the transmission speed, need to be sufficiently extended to allow the complete transmission of both the originating data and the relay data on the associated bus, although the other bus does not need so much data space in that time slot. Moreover referring back to FIG. 3, during each specific time slot, one of the channels is idle in the sense that it is in reception mode but no data is being transmitted to it. In the event of single point failure, this delay can be even worse on some buses as the software will seek to use the remaining buses to relay data around the failed link, as illustrated in FIG. 4B.

Figure 5:
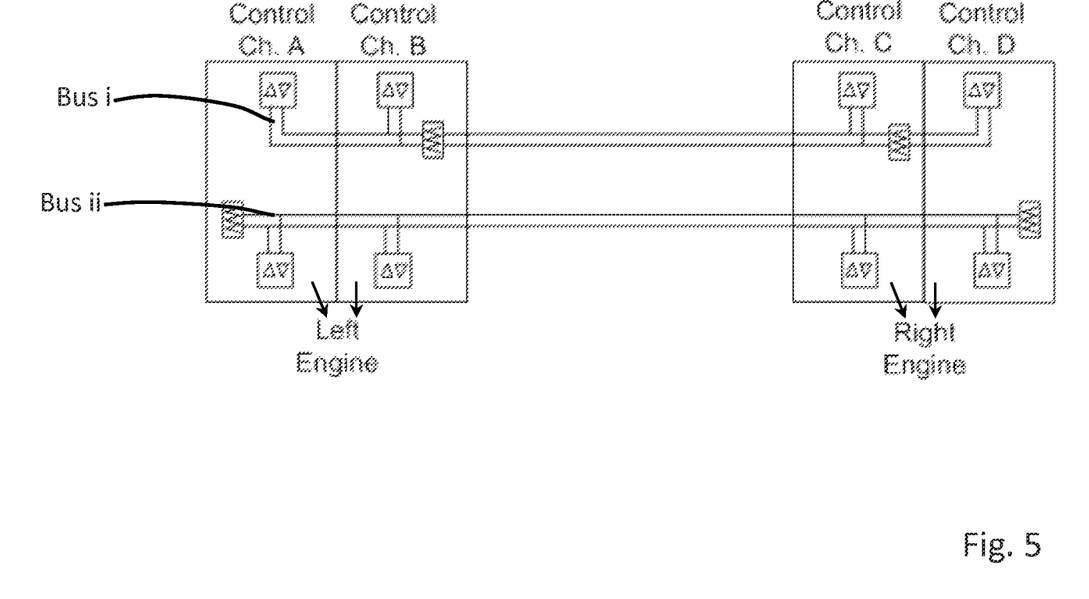
FIG. 5 is a schematic view of a second example of a multiple aircraft engine control system.
Figure 6:
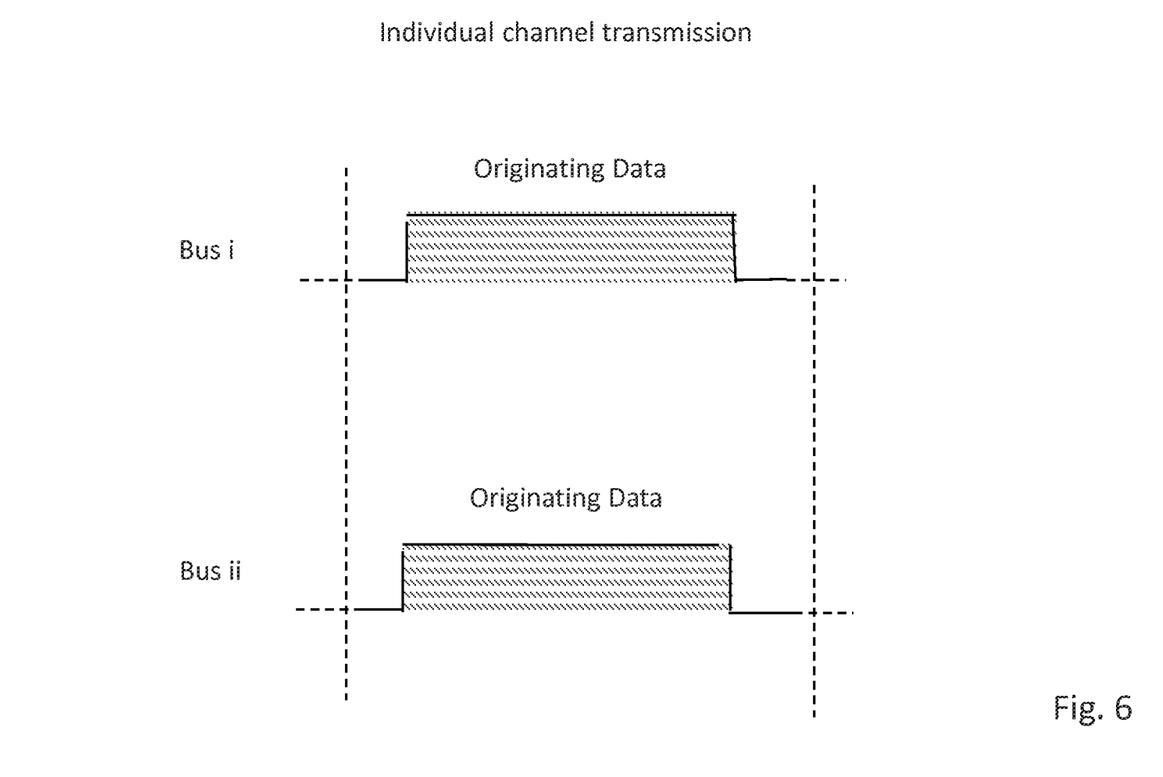
FIG. 6 is a schematic view showing the size of data attribution with the control system of FIG. 5, in a given time slot, in a single channel transmission, having redundancy over two buses.
Figure 7:
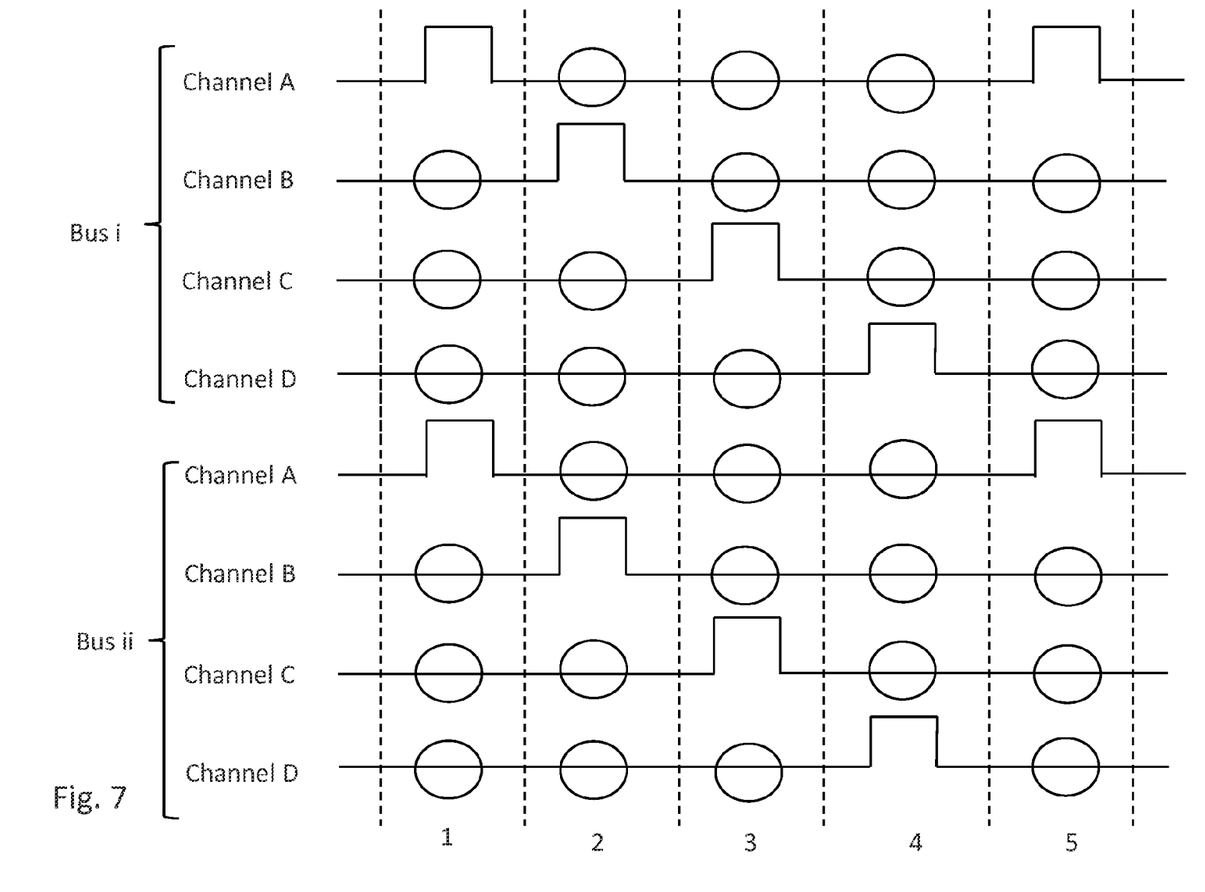
FIG. 7 is a schematic view showing a method of communicating data between channels of the control system of FIG. 5.

An embodiment incorporating improvements is shown in FIG. 5. The embodiment of FIG. 5 uses two independent bus links in a multidrop arrangement in a manner that each channel can simultaneously broadcast to all three of the other channels simultaneously over both buses. As can be understood, the multidrop configuration can avoid the need of relaying data. Accordingly, and as illustrated in FIG. 6, each channel now needs only broadcast its own originating data, which can reduce the time slot size requirement (i.e. avoid delay) in accordance with the removal of the relayed data and the associated individual channel idle time which was shown in FIG. 4B, to thus increase throughput. Moreover, as can be understood with reference to FIG. 7, each channel can receive data from all three other channels, thus avoiding having an idle channel during each time slot as was the case in FIG. 3. Redundancy is provided as shown in FIG. 6 as each data receiver can thus autonomously receive data from the alternate transmitter, via the other bus, in the event that one of the remote transmitters fails. The rebroadcast delay (FIG. 4B) is eliminated and this improves the overall system ability to manage cross engine data between engines. In some cases the broadcast delay can be reduced from 6 to 2 broadcast cycles (associated to a case where the prior relay data had to be further relayed due to single point failure—see FIG. 4B), and in others from 4 to 2 broadcast cycles (see FIG. 4A).

Moreover, in a fully operating system each channel now has the ability to broadcast twice the amount of information since it can use the two multidrop buses independently.

One way to further increase throughput, with this double multidrop bus configuration would be to split the originating data of each channel into two equal data sets, and then repeatedly transmit each set on two different channels. However, this would make the system susceptible to a single point failure as if one bus fails, the associated data set will not be made available to the other channels. According to such a scenario, the redundancy or fault tolerance, highly sought in aeronautic applications, could be lost.

Figure 8:
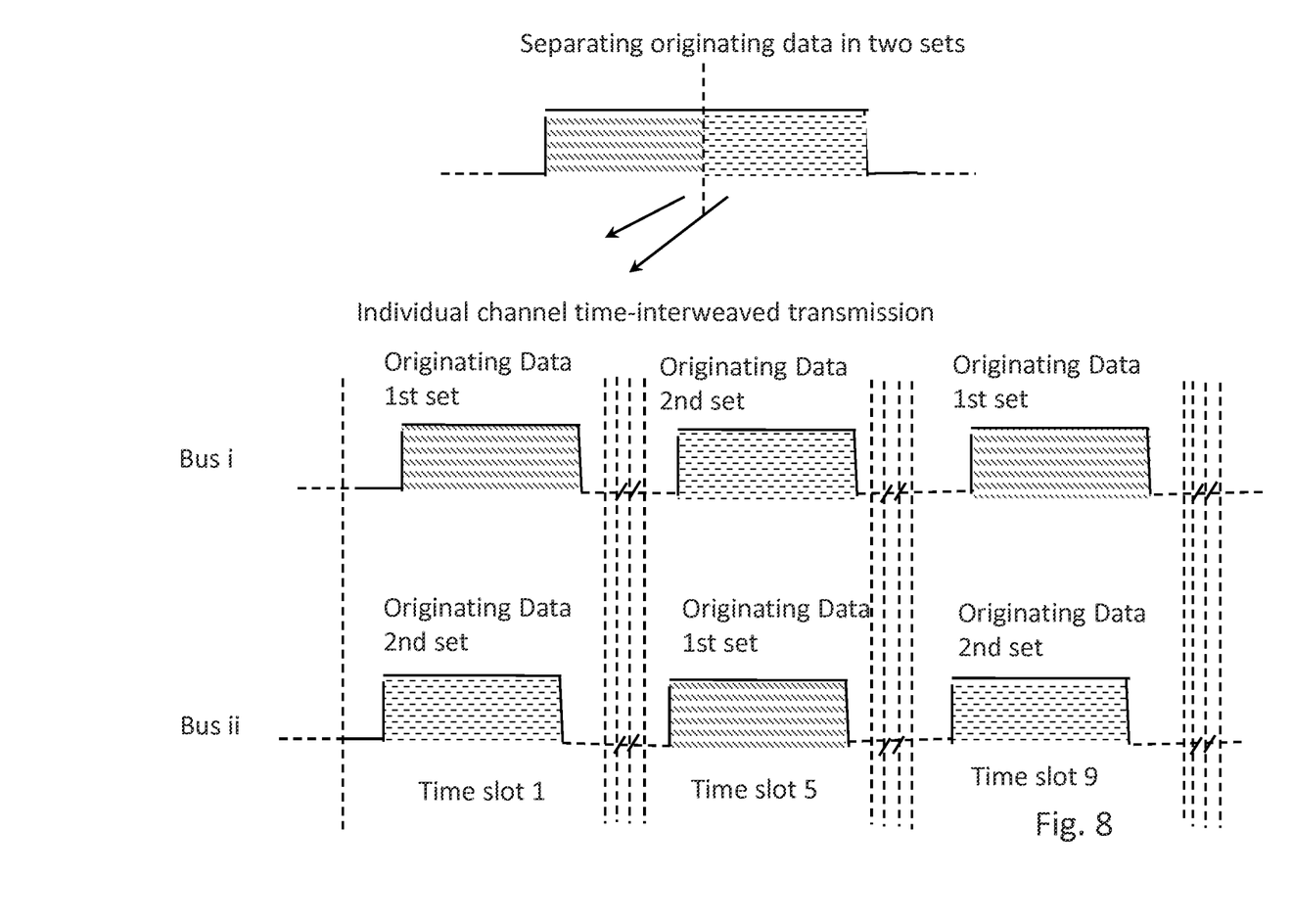
FIG. 8 is a schematic view showing the size of data attribution with the control system of FIG. 5, with data interweaving in sequential time slots, providing redundancy over two cycles.

An embodiment shown in FIG. 8 can achieve increased throughput during fault-less operation while maintaining fault tolerance to single bus failures. As shown in FIG. 8, the engine controllers can be provided with software that will time interweave the data broadcast on both buses. More specifically, a software can divide the whole set of originating data into two sets. During the first time slot, the engine controller can broadcast the first set on bus i and the second set on bus ii. On the subsequent time slot associated to a next broadcast transmission (i.e. a next cycle, such as time slot 5 in an embodiment having 4 channels), it will alternate and broadcast the first data set on bus ii and the second data set on bus i. In this manner, when both buses are working, each channel can broadcast twice the data. However, if one bus fails, each channel is still capable of sending all the data but it takes an extra cycle to get the complete data set transmitted, with the only inconvenience being the absence of this advantage during fault operation. Henceforth, during faultless operation, the broadcast delay is then 2 or 3 cycles and can thus show an improvement of 4 and 6 cycles.

It was found that throughput could also be increased, though a little less than in the embodiment shown in FIG. 8, during fault-less operation while retaining critical data redundancy for during fault tolerance to single-point failures.

The basis for this is that a typical control system uses a small limited set of data between opposite engines for control purposes. For stable operation this represents a limited set of data. Engine speeds, for instance, can be among the most time critical and can need to be updated every control cycle.

To accommodate this need, the software and system can arrange the two data sets so that there is redundancy for these most critical parameters within both data sets.

Figure 9:
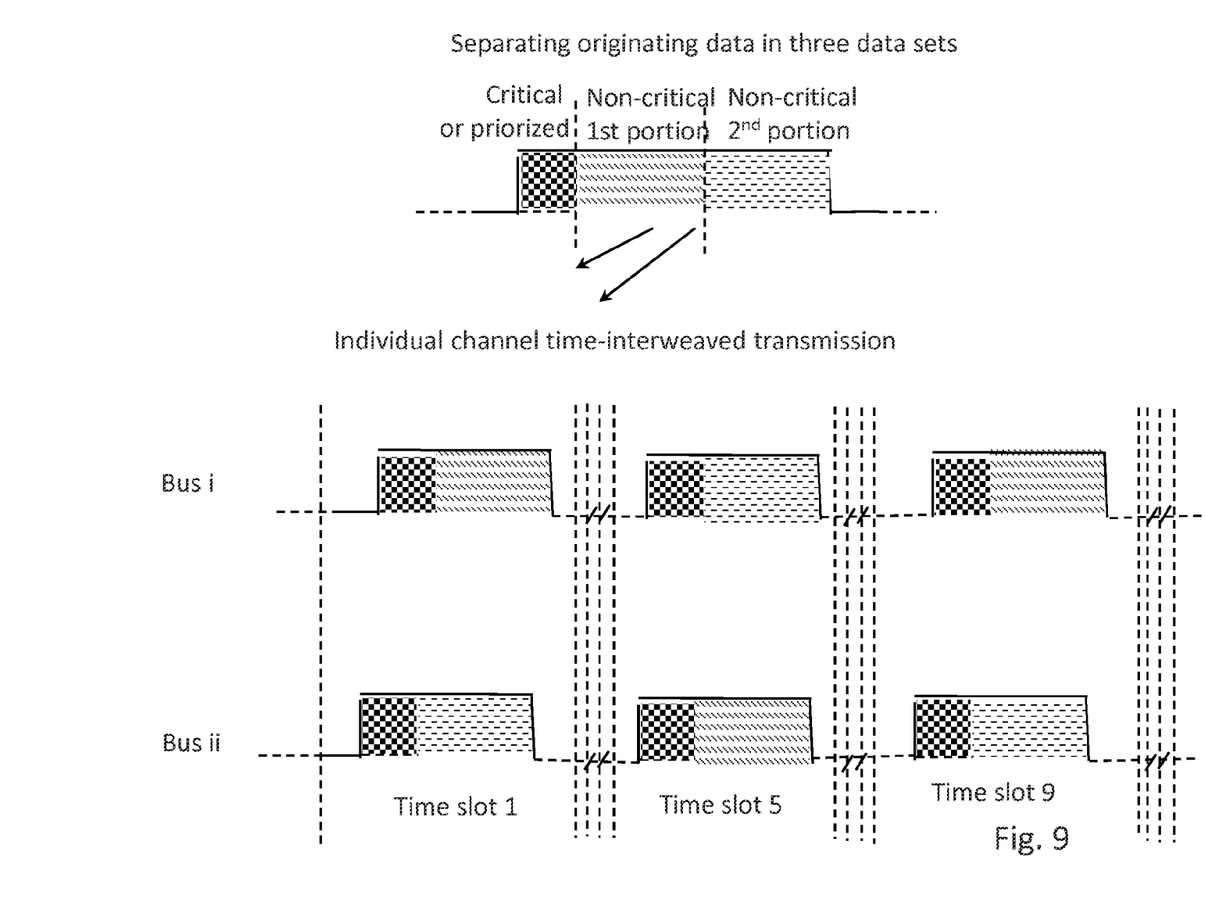
FIG. 9 is a schematic view showing the size of data attribution with the control system of FIG. 5, with critical data redundancy at every transmission and non-critical data redundancy over two cycles.

Referring to FIG. 9, an example is shown where the originating data of each given channel is split as follows: a portion of the originating data considered time-sensitive (critical or otherwise priorized, such as engine speeds) is separated from the remaining secondary portion of the data (such as data which is less critical or varies slowly over time—like outside air temperature for instance). The secondary portion of the data is split into two equal portions which will alternate at each transmission and on each bus while the time-sensitive portion of the data is transmitted simultaneously on both busses and repeated at each transmission. Depending on the functionality required on each aircraft the redundant set of data typically varies from 2 to 6 parameters. The amount of redundant data in each set can be adjusted depending on the specific application in alternate embodiments.

Referring back to FIG. 5, it will be understood that each channel can have a bus termination resistor. In a case where the transmission has 128 bits (extended frame format)+5 bits quiet between messages, it is estimated that approximately 3750 messages/seconds can be achieved at 500 kHz.

The above multidrop bus arrangement can be extended to more engines in a relatively straightforward manner in alternate embodiments. Moreover, additional buses can be used and it will be understood that if applying the multidrop bus arrangement to a greater number of engines, it may not be required for all the buses to extend to all channels.

With an embodiment such as illustrated in FIG. 5, each data packet can include coded identifying coordinates to allow identification of the sending channel, and the software can include a synchronisation algorithm to allow re-synchronizing the channels with associated time slots in the event where two or more of the channels would be detected to transmit at the same time.

Figure 10:
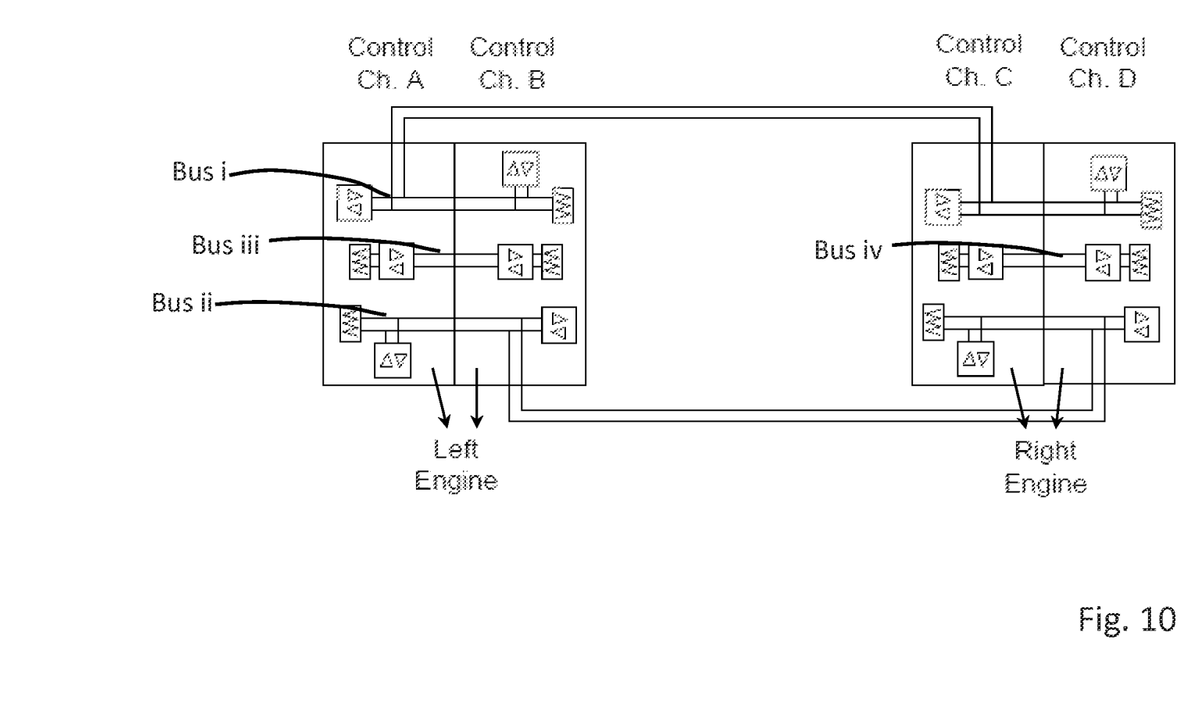
FIG. 10 is a schematic view of a third example of a multiple aircraft engine control system.

FIG. 10 shows a variant of the embodiment shown in FIG. 5. In this variant, the channels on the same engine benefit from an additional dedicated bus (bus iii and bus iv, respectively). Buses between engine controllers of different engines, such as bus i and bus ii typically rely on airframe wiring and connections. Henceforth, in the embodiment shown in FIG. 5, the two channels of each engine can rely on the airframe wiring for their connection. The additional bus between each channel of corresponding engines in the embodiment shown in FIG. 10 allows the two channels on the same engine to communicate. In some installations the airframe wiring may have single point failures (such as a common connector) or operating conditions (single engine dispatch) wherein the two channels cannot communicate. On such aircraft the arrangement proposed in FIG. 5 may not be adequate and that in FIG. 10 could be preferred.

The arrangement in FIG. 10 can also be obtained with relatively simple changes to electronic circuits and wiring configuration. CPU technologies current at the time of drafting this specification (such as MPC5556 and newer) usually integrate 3 and even 4 CANBus communications links onboard the chip. Thus using the current technologies, an additional inter-engine bus would not increase chip count, size, nor weight of the circuit boards. The FADEC software can be modified to supporting 3 CANBus links.

The arrangement in FIG. 10 can also be preferred in single engine turboprop application to allow the two channels to communicate over an internal link which does not require any airframe wiring or connection.

The above description is meant to be exemplary only, and one skilled in the art will recognize that changes may be made to the embodiments described without departing from the scope of the invention disclosed. For example, the specifics of the hardware or software used to embody the invention can vary and can be adapted specifically in view of given applications. Still other modifications which fall within the scope of the present invention will be apparent to those skilled in the art, in light of a review of this disclosure, and such modifications are intended to fall within the scope of the appended claims.

The invention claimed is:

1. A method of communicating data in an aircraft having at least two engines, the method comprising:
    providing a first engine controller associated with a first channel of the first engine and a second engine controller associated with a second channel of the first engine, and a second engine comprising a third engine controller associated with a third channel of the second engine and a fourth engine controller associated with a fourth channel of the second engine;
    providing a first communication bus in a first multidrop arrangement between the first channel, the second channel, the third channel, and the fourth channel, and a second communication bus in a second multidrop arrangement between the first channel, the second channel, the third channel, and the fourth channel; and
    configuring at least one of the first engine controller, the second engine controller, the third engine controller, and the fourth engine controller for:
        separating the data into at least a first portion and a second portion;
        time interweaving the first portion and the second portion of data between the first communication bus and the second communication bus; and
        broadcasting the first portion and the second portion of data on the first communication bus and the second communication bus such that the first portion and the second portion of data are each broadcast twice, once on each of the first communication bus and the second communication bus in alternating order.

2. The method of claim 1, wherein configuring at least one of the first engine controller, the second engine controller, the third engine controller, and the fourth engine controller comprises configuring the first engine controller, the second engine controller, the third engine controller, and the fourth engine controller.

3. The method of claim 2, wherein the method is repeated for multiple transmission cycles.

4. The method of claim 1, wherein separating the data into at least a first portion and a second portion comprises separating the data into a first portion, a second portion, and a third portion, wherein transmitting the first portion comprises transmitting the first portion and the third portion together, and wherein transmitting the second portion comprises transmitting the second portion and the third portion together.

5. The method of claim 4, wherein the third portion of the data is data for which rapid updating is considered critical to aircraft engine operation.

6. An engine control system for an aircraft having at least two engines, the system comprising:
- a first engine comprising a first engine controller associated with a first channel of the first engine and a second engine controller associated with a second channel of the first engine;
- a second engine comprising a third engine controller associated with a third channel of the second engine a fourth engine controller associated with a fourth channel of the second engine;
- a first communication bus in a first multidrop arrangement between the first channel, the second channel, the third channel, and the fourth channel;
- a second communication bus in a second multidrop arrangement between the first channel, the second channel, the third channel, and the fourth channel;
- wherein at least one of the first engine controller, the second engine controller, the third engine controller, and the fourth engine controller is configured for:
  - separating data into at least a first portion and a second portion;
  - time interweaving the first portion and the second portion of data between the first communication bus and the second communication bus; and
  - broadcasting the first portion and the second portion of data on the first communication bus and the second communication bus such that the first portion and the second portion of data are each broadcast twice, once on each of the first communication bus and the second communication bus in alternating order.

7. The multiple aircraft engine control system of claim 6, wherein the first engine controller, second engine controller, third engine controller, and fourth engine controller are integrated in at least one Full Authority Digital Engine Control (FADEC).

8. The system of claim 6, wherein separating data into at least a first portion and a second portion comprises separating the data into a first portion, a second portion, and a third portion, wherein transmitting the first portion comprises transmitting the first portion and third portion together, and wherein transmitting the second portion comprises transmitting the second portion and the third portion together.

9. The system of claim 8, wherein the third portion of the data is data for which rapid updating is considered critical to aircraft engine operation.

10. The system of claim 6, wherein each one of the first, second, third, and fourth channels comprises a bus termination resistor.

11. The system of claim 6, further comprising a third communication bus in a dedicated arrangement between the first channel and the second channel and a fourth communication bus in a dedicated arrangement between the third channel and the fourth channel.

* * * * *